United States Patent
Bailey et al.

(10) Patent No.: US 6,720,693 B2
(45) Date of Patent: Apr. 13, 2004

(54) FLUID MANAGEMENT SYSTEM FOR A HOUSING OF AN ELECTRICAL DEVICE

(75) Inventors: Daniel E. Bailey, Valley Park, MO (US); Nathan C. Owen, Florissant, MO (US); Phillip S. Johnson, Granite City, IL (US); Barry M. Newberg, Florissant, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/202,195

(22) Filed: Jul. 24, 2002

(65) Prior Publication Data

US 2004/0017121 A1 Jan. 29, 2004

(51) Int. Cl.$^7$ .............................. H02K 5/04; H02K 5/10
(52) U.S. Cl. ........................................... 310/89; 310/71
(58) Field of Search ............................. 310/89, 71, 58, 310/62–63, 85, 88; 417/424.1

(56) References Cited

U.S. PATENT DOCUMENTS

| 2,309,670 | A | * | 1/1943 | Ruthman | 310/258 |
| 3,074,347 | A | * | 1/1963 | Clymer | 417/363 |
| 3,270,223 | A | * | 8/1966 | Seely | 310/62 |
| 3,286,712 | A | * | 11/1966 | Roden | 601/167 |
| 3,458,739 | A | * | 7/1969 | Zelinski | 310/62 |
| 3,730,642 | A | * | 5/1973 | Barnstead et al. | 417/423.2 |
| 4,275,321 | A | * | 6/1981 | Shimamoto et al. | 310/59 |
| 4,283,645 | A | * | 8/1981 | Hofmann | 310/87 |
| 4,336,473 | A | * | 6/1982 | Wetters et al. | 310/88 |
| 5,076,762 | A | * | 12/1991 | Lykes et al. | 417/40 |
| 5,861,689 | A | * | 1/1999 | Snider et al. | 310/71 |

FOREIGN PATENT DOCUMENTS

JP 10-174346 * 6/1998 ............ H02K/5/10

* cited by examiner

Primary Examiner—Burton Mullins
(74) Attorney, Agent, or Firm—Thompson Coburn LLP

(57) ABSTRACT

A fluid management system provided on a housing of an electrical device includes a shelf that covers over electrical connections projecting from the housing and includes an annular flange and an annular diverging portion of the housing exterior surface that direct liquid by gravitation away from the electrical connectors projecting from the housing and away from the vent openings of the housing.

19 Claims, 5 Drawing Sheets

FLUID MANAGEMENT SYSTEM FOR A HOUSING OF AN ELECTRICAL DEVICE

BACKGROUND OF THE INVENTION

(1) Field of the Invention

The present invention pertains to a housing of an electric device that is specifically designed to direct liquid dropped onto the housing over an exterior surface of the housing and away from electrical components and vent openings of the device. More specifically, the present invention pertains to a housing of an electrical device that is provided with a shelf that covers over electrical components projecting from the housing and is provided with an annular flange and an annular diverging portion of the housing exterior surface that direct liquid by gravitation away from electrical components projecting from the housing and vent openings of the housing.

(2) Description of the Related Art

Electric motors that are employed in powering water pumps of home appliances, such as clothes washers and dish washers, are often subjected to a humid environment in use. This is particularly true where the construction of the home appliance requires that the electric motor be positioned with its drive shaft oriented vertically to drive a water pump of the appliance positioned above the motor. Any leakage of the pump will often result in water dropping down onto the electric motor. In addition, the motor driving the water pump in the enclosed environment of the appliance will often result in moisture condensing on the motor housing. Should the moisture find its way to the electrical connections of the electric motor or finds its way to the interior of the motor through the motor housing vent openings, short circuiting of the motor could occur or the user of the appliance could receive an electric shock.

Drip pans and gutter-style shields have been employed in the prior art to avoid the problem of leakage from an appliance water pump reaching an electric motor positioned below the pump. The drip pan or shield would be positioned below the water pump and above the motor powering the pump to prevent any leakage from the water pump reaching the motor. However, use of the drip pan or shield had the disadvantage of adding additional component parts to the appliance construction, thus increasing the appliance cost. In addition, use of the drip pan or shield required additional space in the appliance interior to accommodate the drip pan which reduced the space available for the clothes washing or dish washing compartment of the appliance.

What is needed to overcome the above described disadvantages of prior art electrical appliance motors positioned below water pumps is a way of directing liquid away from the electrical connections and vent openings of the motor without adding additional parts to the assembly of the appliance.

SUMMARY OF THE INVENTION

The present invention pertains to a fluid management system incorporated into the construction of a housing of an electric motor that directs liquid by gravitation away from the electrical connections and vent openings of the motor housing. Although the invention is described as being incorporated into the housing of an electric motor, it is equally well suited for use with housings of other types of electrical devices.

The preferred embodiment of the invention is employed on a housing of an electric motor that is positioned with its drive shaft oriented vertically in use. The electric motor housing is basically comprised of a generally circular top wall, a generally circular bottom wall spaced axially below the top wall, and a generally cylindrical side wall that extends axially between the top wall and the bottom wall. Together the top wall, the side wall and the bottom wall enclose an interior volume of the motor housing that contains the electric motor. In the preferred embodiment, the motor housing is constructed in two pieces with the top wall of the housing forming one piece and the side wall and bottom wall of the housing forming the second piece.

The top wall has a shaft opening at its center and the motor shaft projects upwardly through the shaft opening. A cooling fan is mounted on the projecting end of the motor shaft. In use, the fan is positioned between the motor housing and the water pump of the appliance positioned above the motor. The fan has a circular disk at its top, and the blades of the fan extend radially across the bottom surface of the disk. Thus, the disk of the fan provides some shielding of the electric motor from water leaking from the water pump positioned above the motor.

The top wall of the housing has a circular, peripheral edge with an annular flange that extends radially outwardly from the edge. The flange has opposite top and bottom surfaces, and the bottom surface of the flange seats against a top edge of the housing sidewall when the housing top piece is assembled to the housing bottom piece. The top wall flange also has an annular lip that projects axially downward from the bottom surface of the flange. The annular lip is dimensioned so that it is spaced radially outwardly from the housing side wall when the top piece of the housing is assembled to the bottom piece. This positioning of the annular lip allows it to direct liquid leaked onto the housing top wall from the pump over the exterior surface of the top wall and downwardly over the lip where the liquid will drip from the annular lip.

The top wall or the top piece of the housing is also provided with a shelf or ledge that projects outwardly from the peripheral edge of the top wall. The shelf is positioned axially above an electrical connector opening provided in the side wall of the housing. The shelf has opposite side edges that extend radially outwardly to a distal end of the shelf. A ridge projects axially upwardly from the shelf distal edge and functions as a gutter that directs any moisture that flows over the shelf top surface away from the shelf distal edge and toward the side edges of the shelf. A pair of side panels extend axially downwardly from the shelf side edges and together the shelf bottom surface and the pair of side panels completely cover the electric connectors of the electric motor projecting from the side wall of the motor housing. Any liquid that gravitates over the top wall of the housing onto the top surface of the shelf is directed by the shelf ridge and the shelf side panels downwardly around the electric connectors of the motor.

The bottom piece of the motor housing is provided with a plurality of vent openings in the area of the motor housing where the bottom wall joins with the housing side wall. The plurality of vent openings are spatially arranged around the peripheral edge of the bottom wall. To prevent any liquid that gravitates downwardly across the motor housing from entering the vent openings, a portion of the exterior surface of the housing side wall diverges radially outwardly as it extends axially downwardly toward the vent openings. The diverging portion of the side wall exterior surface extends downwardly to an underside surface of the side wall that is positioned immediately above the vent openings of the housing. The underside surface extends axially downwardly as it extends radially outwardly away from the vent openings toward the side wall exterior surface. Because the underside surface extends axially downwardly as it extends outwardly away from the vent openings, any liquid gravitating downwardly across the exterior surface of the motor housing side wall is caused to drip from the outer edge of the housing where the side wall joins with the underside surface and thereby drips away from the motor housing and away from the vent openings.

The electric motor housing of the invention constructed in the manner discussed above directs any liquid that drips downwardly onto the housing to drain downwardly across the exterior surface of the housing and away from the motor electrical connections and the housing vent openings, thereby eliminating the problem of liquid potentially short circuiting the motor.

BRIEF DESCRIPTION OF THE DRAWINGS

Further features of the present invention are revealed in the following detailed description of the preferred embodiment of the invention and in the drawing figures wherein.

DETAILED DESCRIPTION OF THE PREFERRED EMBODIMENTS

Figure 1:
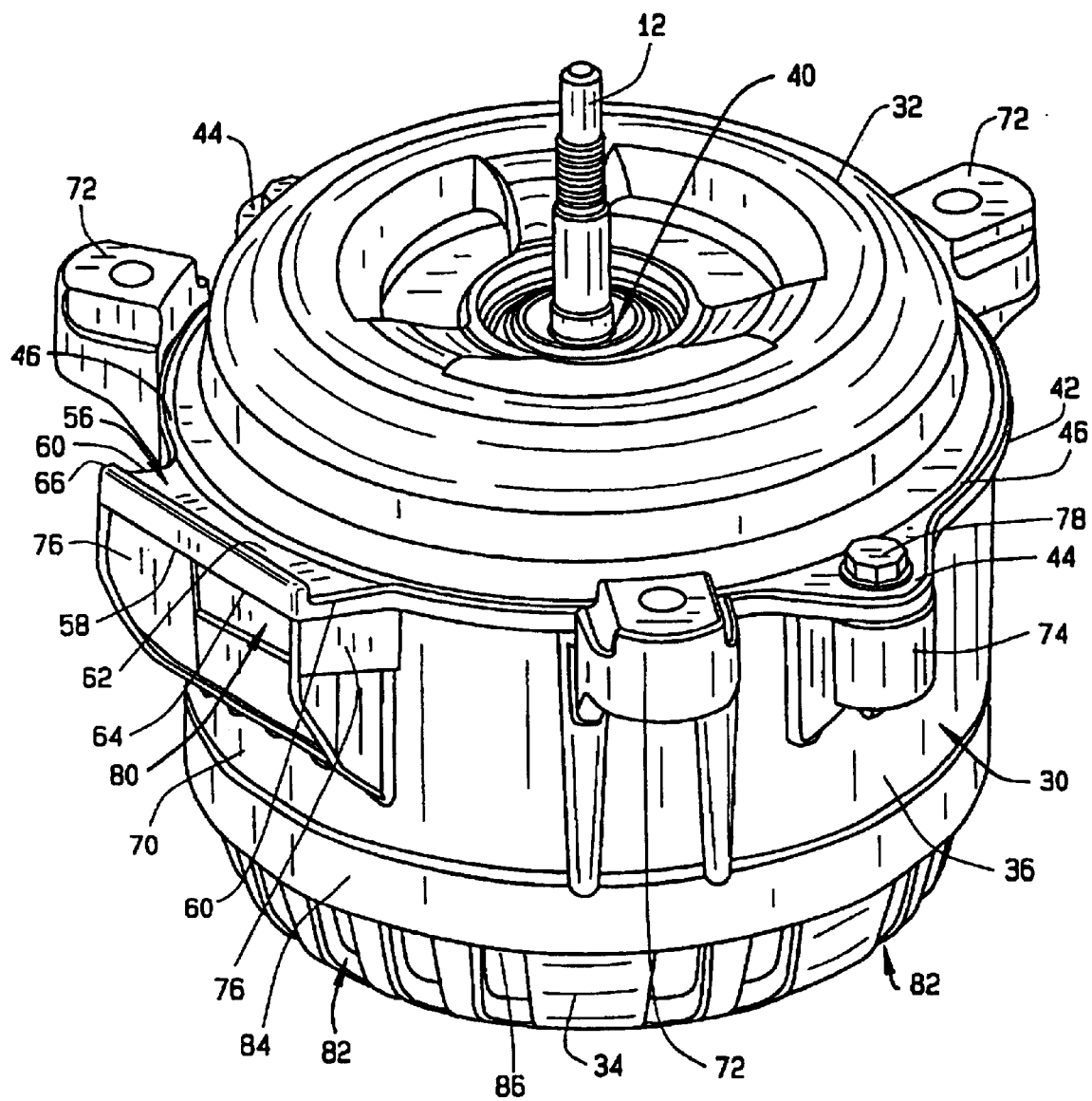
FIG. 1 is a top perspective view of the housing of the present invention.

As stated earlier, the basic construction of the housing of an electrical device, for example an electric motor, includes at least one opening in the housing through which the electrical connectors of the motor extend. In addition, the motor housing usually includes a plurality of vent openings that allow cooling air to flow through the housing interior. The presence of the electrical connectors projecting from the housing and the plurality of vent openings through the housing create the potential for short circuiting of the motor when the motor is used in an environment where moisture is present.

The inventon's fluid management system for a motor housing functions to direct liquid leaked onto the housing away from the electrical connections and vent openings without adding additional component parts to the motor or increasing the size of the motor housing. Although the fluid management system of the invention is described as being employed on the housing of an electric motor, it is equally well suited for use with housings of other types of electrical devices.

The electric motor contained in the housing employing the fluid management system of the invention may be any type of electric motor or other electrical device, and therefore is only described generally. The motor 10 is comprised of a motor shaft 12 that is oriented vertically in the illustrative environment of the invention. A pair of bearing assemblies 14 are mounted to opposite ends of the motor shaft. A rotor 16 is mounted on the shaft intermediate to the bearings. The rotor 16 is positioned in the interior bore of the motor stator assembly 18. The center axis 20 of the motor shaft 12 defines mutually perpendicular axial and radial directions referred to in describing the fluid management system of the invention.

A fan 22 is mounted on the end of the motor shaft that projects from the housing. The fan is provided to draw cooling air through the interior of the housing, as is conventional. The fan has a circular disk 24 at its top as viewed in FIGS. 2 and 3, and a plurality of blades 26 that extend radially across the bottom surface of the disk. Thus, the disk 24 of the fan provides some shielding of the top of the electric motor from water leaking from a position above the motor. Any liquid that leaks onto the disk 24 will be spun off the disk when the motor is operated or will be directed to the periphery of the disk and drip onto the periphery of the motor housing when the motor is not operating.

Figure 3:
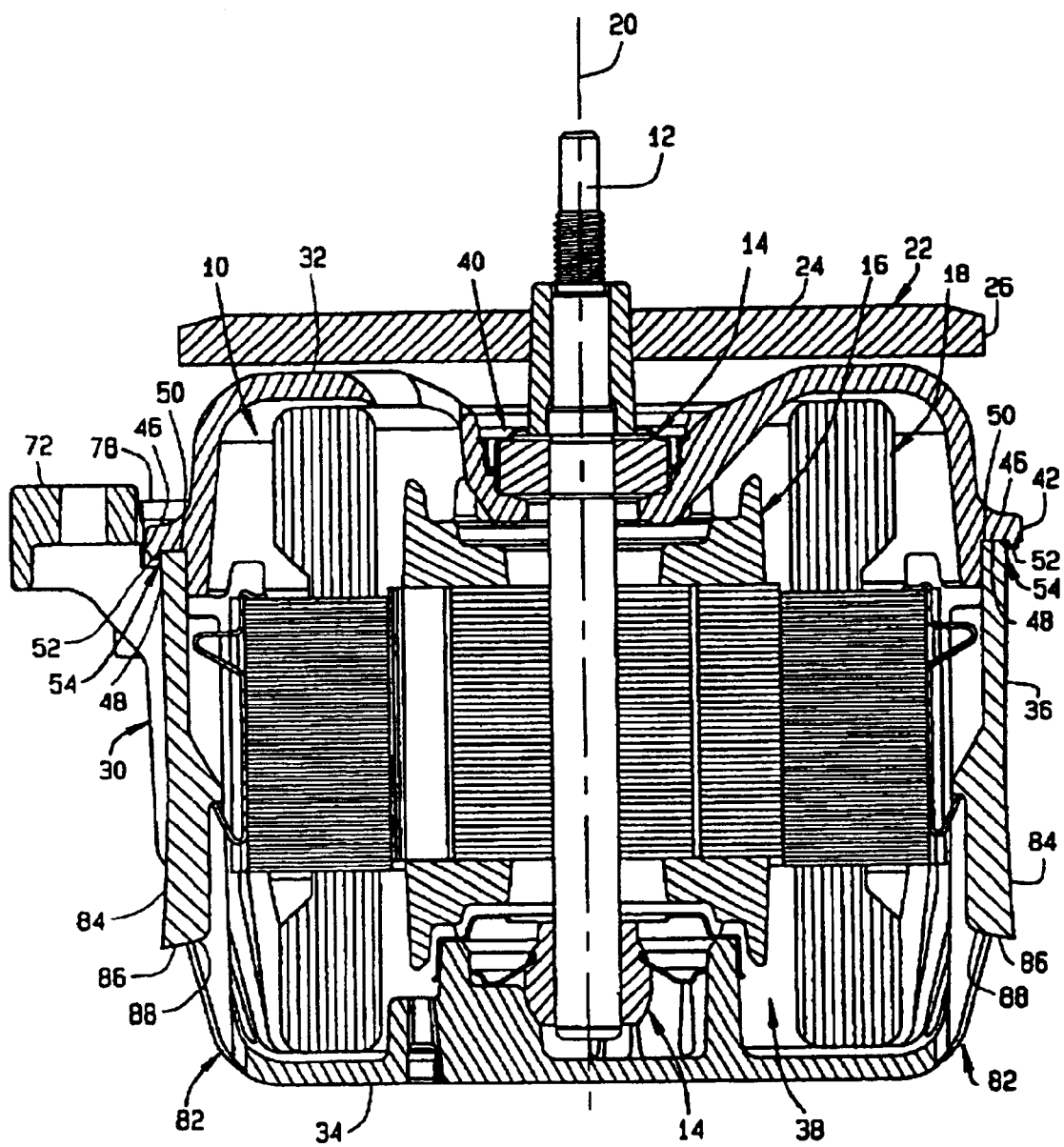
FIG. 3 is a side, sectioned view of the motor housing and fan.
Figure 4:
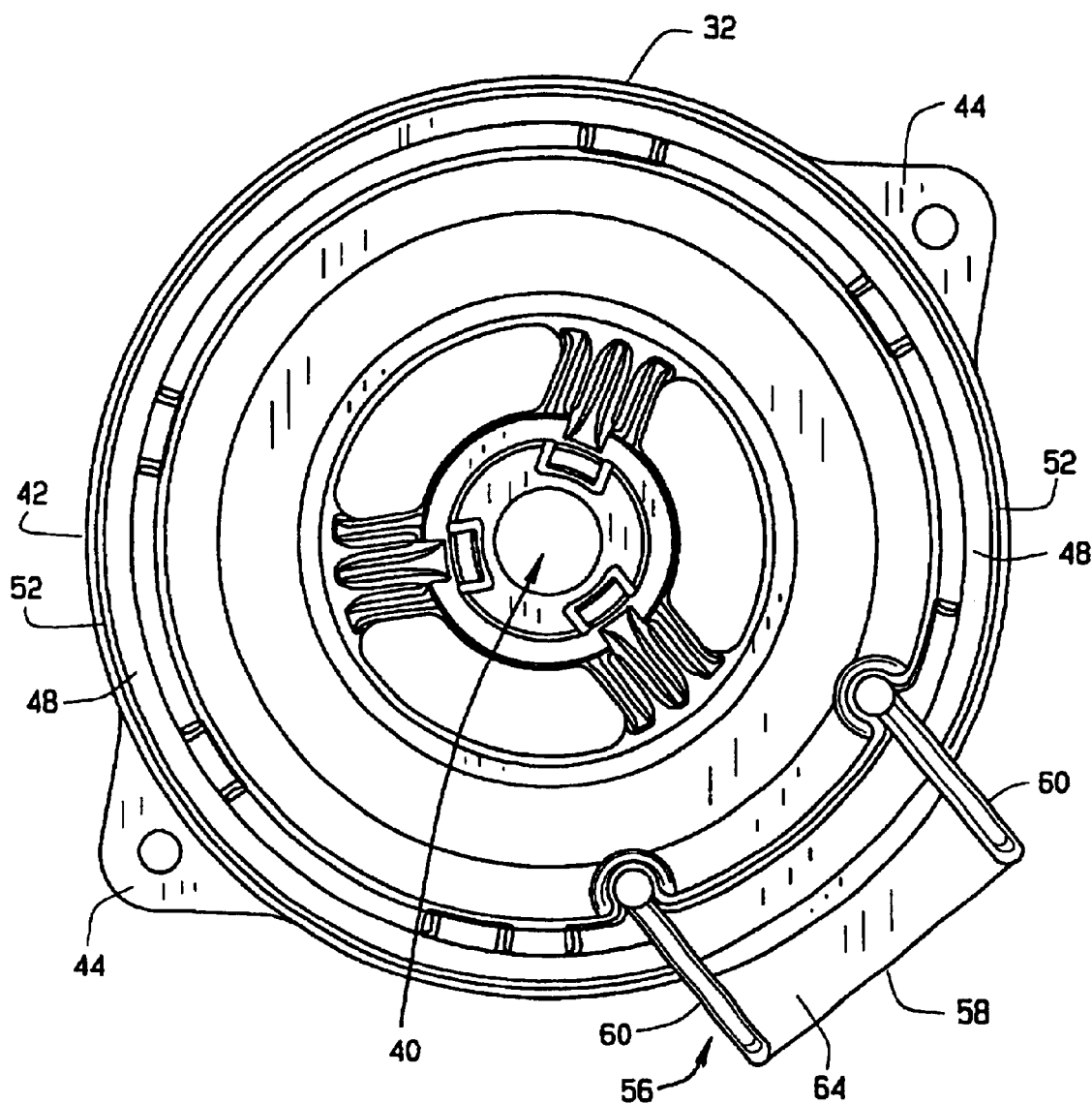
FIG. 4 is a plan view of the bottom of the housing top wall.
Figure 5:
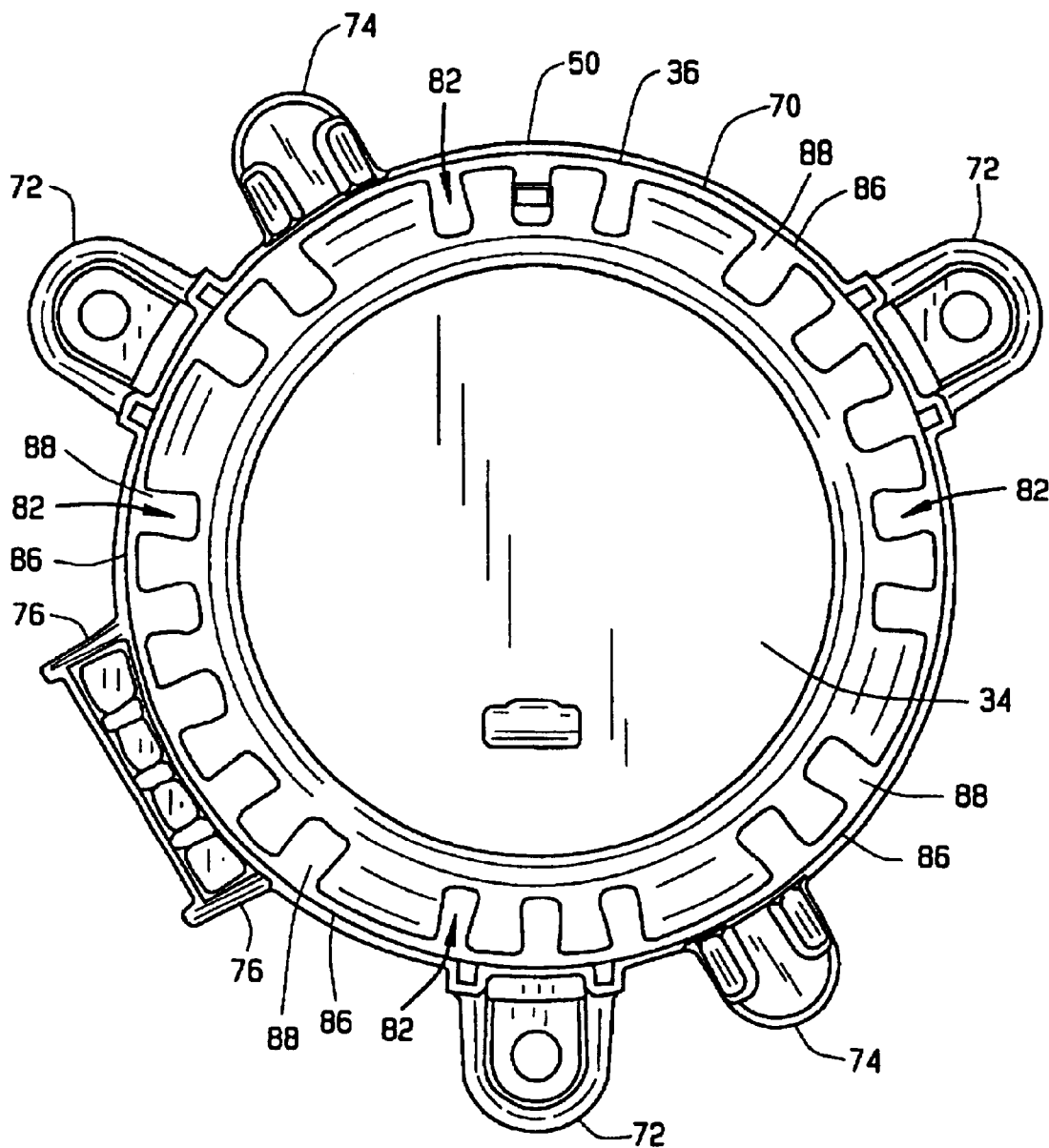
FIG. 5 is a plan view of the bottom of the housing bottom wall.

The electric motor housing 30 employing the fluid management system of the invention is basically comprised of a generally circular top wall 32, a generally circular bottom wall 34 spaced axially below the top wall, and a generally cylindrical side wall 36 that extends axially between the top wall and the bottom wall. Together the top wall 32, the side wall 36 and the bottom wall 34 enclose an interior volume 38 of the motor housing that contains the electric motor. In the preferred embodiment, the motor housing 30 is constructed in two pieces. The top wall 32 of the housing forms one piece and the side wall 36 and bottom wall 34 of the housing form the second piece, as is shown in FIG. 3.

The top wall 32 has a shaft opening 40 at its center and the motor shaft 12 projects upwardly through the shaft opening. One of the two bearing assemblies 14 on the shaft 12 is mounted in the shaft opening 40 in a conventional manner. The top wall 32 extends radially outwardly from the shaft opening 40 to a circular, peripheral edge of the top wall defined by an annular flange 42 that extends radially outwardly from the top wall. The annular flange 42 extends completely around the periphery of the top wall. The annular flange 42 is basically circular, except for the presence of a pair of fastener lobes 44 that project radially outwardly from the periphery of the top wall 32 on opposite sides of the top wall as shown in FIG. 1. The flange has opposite top 46 and bottom 48 surfaces. The flange bottom surface 48 seats against a top edge surface 50 of the housing side wall 36 when the housing top piece is assembled to the housing bottom piece. The top wall flange also has an annular lip 52 on its bottom surface 48 that projects axially downwardly from the bottom surface. The annular lip 52 extends completely around the flange bottom surface 48, including the circular portions of the flange bottom surface as well as the bottom surfaces of the flange fastener lobes 44. The annular lip 52 is dimensioned so that it is spaced radially outwardly from the housing side wall 36 leaving an annular gap 54 between the lip and side wall when the housing top piece is assembled to the housing bottom piece. This positioning of the annular lip 52 allows it to direct liquid dripped from the fan disk 24 onto the housing top wall over the periphery of the top wall and downwardly over the lip 52 where the liquid will drip from the lip. With the annular lip 52 being positioned radially outwardly from the exterior surface of the housing side wall 36 as shown in FIG. 3, the liquid that drips from the annular lip 52 will also be positioned radially outwardly from the housing side wall and will not travel into or wick into any of the vent openings in the housing side wall.

The top wall 32 or the top piece of the housing is also provided with a shelf or ledge 56 that projects radially outwardly from the top wall peripheral edge. The shelf 56 is positioned axially above an electrical connector opening (not shown) provided in the side wall 36 of the housing which is described later. The shelf 56 projects radially outwardly from the top wall annular flange 42 to a distal edge 58 of the shelf. The shelf has a pair of opposite side edges 60 that extend radially outwardly from the annular flange 42 to the shelf distal edge 58. Together, the pair of side edges 60 and the distal edge 58 of the shelf separate a top surface 62 of the shelf from an opposite bottom surface 64 of the shelf. A ridge 66 projects axially upwardly from the shelf distal edge 58 and extends completely across the shelf distal edge between the pair of side edges 60. The ridge 66 functions as a gutter that directs any liquid that flows over the shelf top surface 62 from the housing top wall 32 away from the shelf distal edge 58 and toward the side edges 60 of the shelf.

The housing side wall 36 has a generally cylindrical exterior surface 70 except for the presence of a plurality of mounting lugs 72, a pair of fastener seats 74 and a pair of side panels 76. The mounting lugs 72 are employed in mounting the motor housing 30 to a separate support structure. The fastener seats 74 receive threaded fasteners 78 that are inserted through the top wall fastener lobes 44 and are threaded into internal threading (not shown) of the fastener seats 74 when attaching the top wall 32 or top piece of the housing to the side wall 36 or bottom piece of the housing. With the top wall 32 attached to the side wall 36, the annular lip 52 that projects from the bottom surface 48 of the top wall flange extends completely around the side wall exterior surface 70 in a position spaced radially outwardly from the exterior surface as shown in FIG. 3. The flange annular lip 52 also extends around the side wall fastener seats 74 in a position spaced radially outwardly from the fastener seats. As explained earlier, this positioning of the annular lip 52 allows it to direct liquid dripped onto the housing top wall 32 over the periphery of the top wall and downwardly over the lip where the liquid will drip from the lip. With the lip being positioned radially outwardly from the side wall exterior surface 70 including the exterior surfaces of the fastener seats 74, the liquid that drips from the lip 52 will be positioned radially outwardly from the exterior of the side wall and will not travel downwardly across the side wall where it can travel into or wick into a vent opening of the housing side wall.

Figure 2:
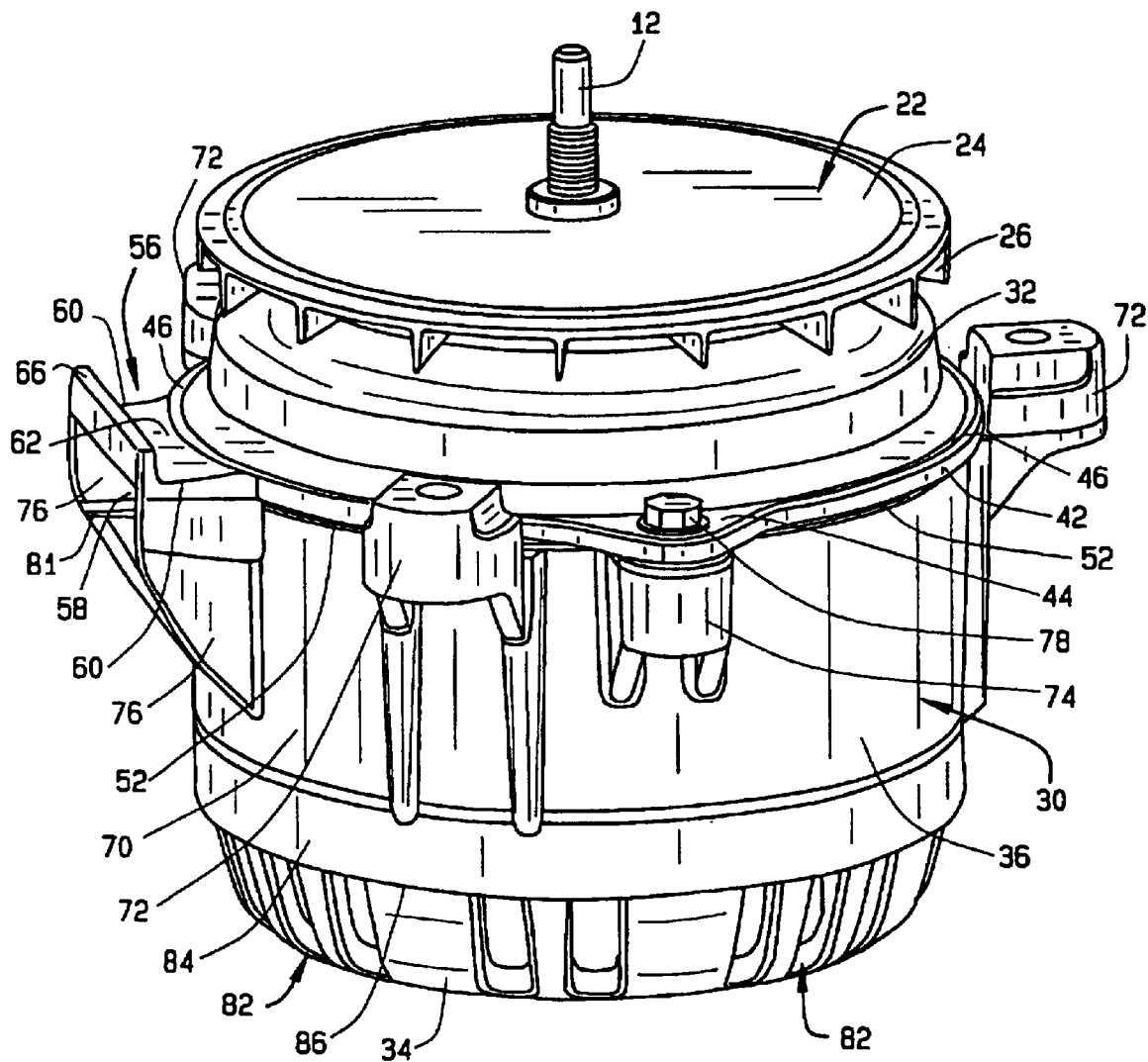
FIG. 2 is a top perspective view of the housing with the motor fan installed on the motor shaft.

The pair of side panels 76 are positioned adjacent the top edge 50 of the side wall and on opposite sides of an electrical connector opening 80 through the side wall shown in FIG. 1. As seen in FIGS. 1 and 2, the pair of side panels 76 are positioned directly below the top wall shelf 56 and extend axially downwardly from beneath the shelf side edges 60. The side panels 76 project radially outwardly from the side wall exterior surface 70 to positions beneath the shelf distal edge 58 so that the pair of side panels 70 extend radially along the entire lengths of the shelf side edges 60. Together, the shelf 56 and the pair of side panels 76 completely cover over the motor electrical connectors 81 projecting from the side wall of the motor housing shown in FIG. 2. Any liquid that gravitates over the housing top wall 32 onto the top surface 62 of the shelf is directed by the shelf ridge 66 to the opposite side edges 60 of the shelf and then is directed axially downwardly over the pair of side panels 76 and around the electrical connectors of the motor.

A plurality of vent openings 82 are provided through the bottom piece of the motor housing in the area of the housing where the bottom wall 34 joins with the side wall 36. The plurality of vent openings 82 are spatially arranged around the peripheral edge of the housing bottom wall 34. To prevent any liquid that gravitates downwardly across the motor housing from entering the vent openings 82, a lower portion 84 of the side wall exterior surface 70 diverges radially outwardly as it extends axially downwardly toward the vent openings 82. The diverging portion 84 of the side wall exterior surface extends completely around the housing and can best be seen in FIG. 3. The exterior surface diverging portion 84 extends downwardly to a bottom edge 86 of the exterior surface where the diverging portion joins with an underside surface 88 of the side wall. The side wall underside surface 88 is positioned immediately above the plurality of vent openings 82 and extends completely around the housing. As seen in FIG. 3, the underside surface 88 extends axially downwardly as it extends radially outwardly from the vent openings 82 to the bottom edge 86 of the side wall exterior surface. The bottom edge 86 of the side wall also extends completely around the side wall. Because the underside surface 88 extends axially downwardly as it extends radially outwardly away from the vent openings 82, any liquid gravitating downwardly across the side wall exterior surface 70 is caused to drip from the bottom edge 86 of the side wall and thereby drips away from the motor housing and away from the plurality of vent openings 82.

Thus, any liquid that drips downwardly onto the electric motor housing 30 employing the fluid management system of the invention described above is directed by gravitation over the exterior surface of the housing and away from the motor electrical connections 81 and the plurality of vent openings 82, thereby eliminating the problem of liquid potentially short circuiting the motor.

While the invention has been described by reference to a specific embodiment, it should be understood that modifications and variations of the invention may be constructed without departing from the scope of the invention defined by the following claims.

What is claimed is:

1. A housing of an electrical device that is designed to direct liquid by gravitation over an exterior surface of the housing, the housing comprising:

a top wall having an exterior surface with an outer peripheral edge and a center shaft hole, the shaft hole having a center axis that defines mutually perpendicular axial and radial directions relative to the housing;

a bottom wall spaced axially below the top wall, the bottom wall having an exterior surface with an outer peripheral edge;

a side wall extending axially between the top wall and the bottom wall and together with the top wall and the bottom wall enclosing an interior volume of the housing;

at least one electrical connector projecting radially outwardly from the side wall;

a shelf projecting radially outwardly from the top wall and positioned axially above the at least one electrical connector; and, the shelf having a distal edge positioned radially outwardly from the side wall and a ridge projecting axially upwardly from the shelf distal edge.

2. The housing of claim 1, further comprising:

the ridge being positioned radially outwardly from the electrical connector.

3. A housing of an electrical device that is designed to direct liquid by gravitation over an exterior surface of the housing, the housing comprising:

a top wall having an exterior surface with an outer peripheral edge and a center shaft hole, the shaft hole having a center axis that defines mutually perpendicular axial and radial directions relative to the housing;

a bottom wall spaced axially below the top wall, the bottom wall having an exterior surface with an outer peripheral edge;

a side wall extending axially between the top wall and the bottom wall and together with the top wall and the bottom wall enclosing an interior volume of the housing;

at least one electrical connector projecting radially outwardly from the side wall;

a shelf projecting radially outwardly from the top wall and positioned axially above the at least one electrical connector; and, the shelf having opposite top and bottom surfaces, the at least one electrical connector being positioned beneath the shelf bottom surface and a ridge projecting upwardly from the shelf top surface.

4. A housing of an electrical device that is designed to direct liquid by gravitation over an exterior surface of the housing, the housing comprising:

a top wall having an exterior surface with an outer peripheral edge and center shaft hole, the shaft hole having a center axis that defines mutually perpendicular axial and radial directions relative to the housing;

a bottom wall spaced axially below the top wall, the bottom wall having an exterior surface with an outer peripheral edge;

a side wall extending axially between the top wall and the bottom wall and together with the top wall and the bottom wall enclosing an interior volume of the housing;

at least one electrical connector projecting radially outwardly from the side wall;

a shelf on the top wall, the shelf projecting radially outwardly from the top wall and positioned axially above the at least one electrical connector; and, the shelf completely covering over the at least one electrical connector.

5. The housing of claim 4, further comprising:

the shelf having a distal edge positioned radially outwardly from the side wall and a pair of side edges that extend radially outwardly from the side wall to the shelf distal edge, and the at least one electrical connector being positioned between the pair of side edges.

6. The housing of claim 4, further comprising:

a pair of side panels extending axially downwardly from the shelf with the pair of side panels being positioned on opposite sides of the at least one electrical connector.

7. A housing of an electrical device that is designed to direct liquid by gravitation over an exterior surface of the housing, the housing comprising:

a top wall having an exterior surface with an outer peripheral edge and a center shaft hole, the shaft hole having a center axis that defines mutually perpendicular axial and radial directions relative to the housing;

a bottom wall spaced axially below the top wall, the bottom wall having an exterior surface with an outer peripheral edge;

a side wall extending axially between the top wall and the bottom wall and together with the top wall and the bottom wall enclosing an interior volume of the housing;

at least one electrical connector projecting radially outwardly from the side wall;

a shelf projecting radially outwardly from the top wall and positioned axially above the at least one electrical connector, the shelf having a distal edge positioned radially outwardly from the side wall and a pair of side edges that extend radially outwardly from the side wall to the shelf distal edge, and the at least one electrical connector being positioned between the pair of side edges; and, a pair of side panels extending axially downwardly from the shelf with each side panel extending downwardly from a side edge of the shelf.

8. The housing of claim 7, further comprising:

the pair of side panels being positioned on opposite sides of the at least on electrical connector.

9. A housing for an electrical device that is designed to direct liquid by gravitation over an exterior surface of the housing, the housing comprising:

a top wall having an exterior surface with an outer peripheral edge and a center shaft hole, the shaft hole having a center axis that defines mutually perpendicular axial and radial directions relative to the housing;

a bottom wall spaced axially below the top wall, the bottom wall having an exterior surface with an outer peripheral edge;

a side wall extending axially between the top wall and the bottom wall and together with the top wall and the bottom wall enclosing an interior volume of the housing, the side wall having at least one vent opening through the side wall;

a flange projecting radially outwardly from the side wall in a position axially above the at least one vent opening, the flange having axially opposite top and bottom surfaces and a lip projecting axially downwardly from the flange bottom surface.

10. The housing of claim 9, further comprising:

the lip being positioned on the flange bottom surface spaced radially outwardly from the side wall leaving an annular gap between the lip and side wall.

11. The housing of claim 9, further comprising:

the lip extending completely around the side wall.

12. A housing for an electrical device that is designed to direct liquid by gravitation over an exterior surface of the housing, the housing comprising:

a top wall having an exterior surface with an outer peripheral edge and a center shaft hole, the shaft hole having a center axis that defines mutually perpendicular axial and radial directions relative to the housing;

a bottom wall spaced axially below the top wall, the bottom wall having an exterior surface with an outer peripheral edge;

a side wall extending axially between the top wall and the bottom wall and together with the top wall and the bottom wall enclosing an interior volume of the housing, the side wall having at least one vent opening through the side wall;

a flange projecting radially outwardly from the side wall in a position axially above the at least one vent opening;

the at least one vent opening being one of a plurality of vent openings that are spatially arranged around the side wall and the flange being an annular flange that extends completely around the side wall over the plurality of vent openings; and, the flange having axially Opposite top and bottom surfaces and a lip projecting downwardly from the flange bottom surface and extending completely around the side wall.

13. The housing of claim 12, further comprising:

the lip being positioned on the flange bottom surface spaced radially outwardly from the side wall.

14. A housing for an electrical device that is designed to direct liquid by gravitation over an exterior surface of the housing, the housing comprising:

a top wall having an exterior surface with an outer peripheral edge and a center shaft hole, the shaft hole having a center axis that defines mutually perpendicular axial and radial directions relative to the housing;

a bottom wall spaced axially below the top wall, the bottom wall having an exterior surface with an outer peripheral edge;

a side wall extending axially between the top wall and the bottom wall and together with the top wall and bottom wall enclosing an interior volume of the housing, the side wall having at least one vent opening through the side wall, the side wall having an exterior surface portion with a bottom edge axially above and spaced radially outwardly from the at least one vent opening and the exterior surface portion diverging radially outwardly as the exterior surface portion extends axially downwardly toward the at least one vent opening.

15. The housing of claim 14, further comprising:

the at least one vent opening being one of a plurality of vent openings through the side wall, the plurality of vent openings being spatially arranged around the side wall and the side wall exterior surface portion extending completely around the side wall in a position axially above the plurality of vent openings.

16. The housing of claim 15, further comprising:

the side wall having an underside surface positioned axially below the side wall exterior surface portion and the underside surface extending axially upwardly and radially inwardly from the side wall exterior surface portion toward the plurality of vent openings.

17. A housing for an electrical device that is designed to direct liquid by gravitation over an exterior surface of the housing, the housing comprising:

a top wall having an exterior surface with an outer peripheral edge and a center shaft hole, the shaft hole having a center axis that defines mutually perpendicular axial and radial directions relative to the housing;

a bottom wall spaced axially below the top wall, the bottom wall having an exterior surface with an outer peripheral edge;

a side wall extending axially between the top wall and the bottom wall and together with the top wall and bottom wall enclosing an interior volume of the housing, the side wall having at least one vent opening through the side wall, the side wall having an exterior surface portion axially above the at least one vent opening and the exterior surface portion diverging radially outwardly as the exterior surface portion extends axially downwardly toward the at least one vent opening;

the side wall having an underside surface positioned axially below the side wall exterior surface portion and the underside surface extending axially upwardly and radially inwardly from the side wall exterior surface portion toward the at lease one vent opening.

18. The housing of claim 17, further comprising:

the underside surface being positioned axially above the at least one vent opening and extending completely around the side wall.

19. The housing of claim 16, further comprising:

the underside surface being positioned axially above the plurality of vent opening and extending completely around the side wall.

* * * * *